Feb. 3, 1942. C. G. OLSON 2,271,844
SCREW AND WASHER FEEDING DEVICE
Filed Jan. 15, 1940 2 Sheets-Sheet 1

INVENTOR.
Carl G. Olson
BY Cox & Moore
ATTORNEYS

Feb. 3, 1942.                C. G. OLSON                 2,271,844
                    SCREW AND WASHER FEEDING DEVICE
                     Filed Jan. 15, 1940          2 Sheets-Sheet 2
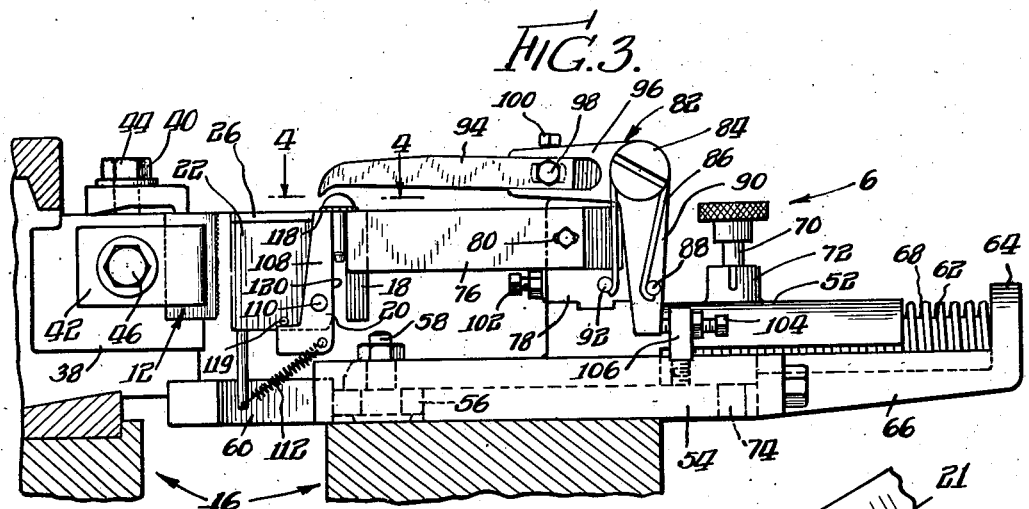
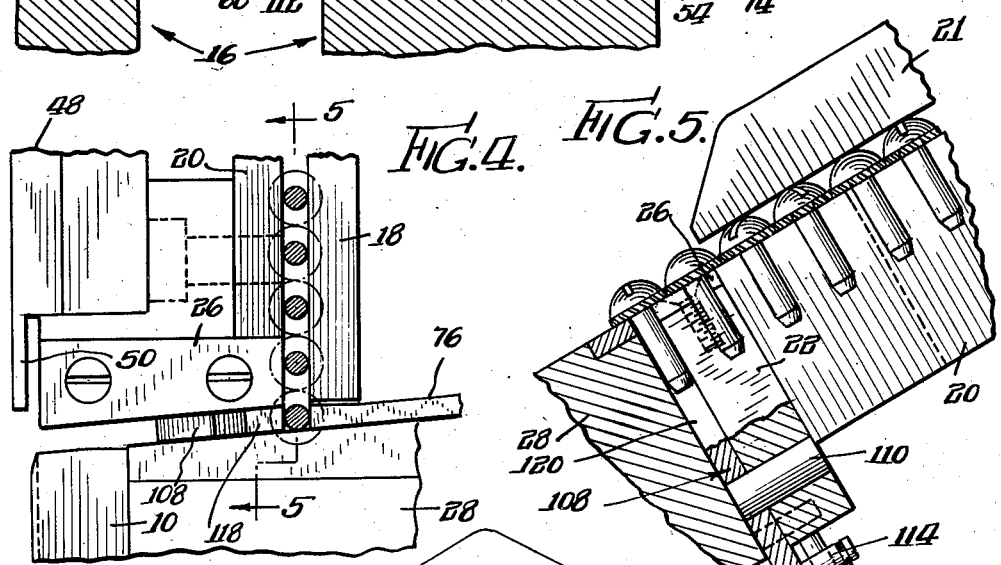
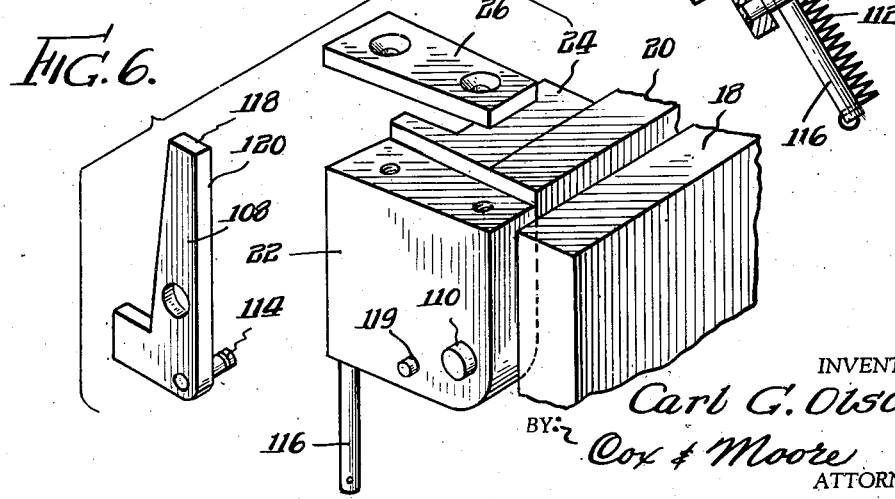
INVENTOR.
Carl G. Olson
BY Cox & Moore
ATTORNEYS.

Patented Feb. 3, 1942

2,271,844

UNITED STATES PATENT OFFICE 2,271,844

SCREW AND WASHER FEEDING DEVICE

Carl G. Olson, Chicago, Ill., assignor to Illinois Tool Works, Chicago, Ill., a corporation of Illinois Application January 15, 1940, Serial No. 313,979

9 Claims. (Cl. 10—162)

This invention relates to a mechanism for feeding fastener units and more particularly to an improved mechanism for transferring screw blank and washer assembly units from a line of such units, as in a feed chute, to a thread forming or thread rolling mechanism or dies.

It is an object of this invention to provide an improved transfer mechanism for feeding headed fasteners from one guide channel or chute to and along a second guide channel or chute transverse to the first channel or chute and which transfer mechanism includes means for supporting the heads of the fasteners during movement of the fasteners from the first to the second channel or chute and so as positively to prevent such tilting of the fasteners as heretofore sometimes caused a jamming of the fasteners in the second channel or chute.

Applicant's invention further contemplates a mechanism for transferring screw blank and washer assembly units from a first feed chute along a second feed chute to a thread forming or thread rolling mechanism wherein the transfer mechanism includes means shiftable in the second chute from a first position wherein it is alined with and constitutes an extension of a rail of the first chute, so as to guide the units into the second chute, to a second position wherein it is out of alinement with the rail of said first chute and permits movement of the units along the second chute.

A further object of the invention is to provide an improved transfer mechanism for feeding screw and washer assembly units from a feed chute to thread rolling dies wherein the mechanism is provided with means for preventing tilting of the washers on the screws during the transfer, thereby to prevent jamming of the washers in the transfer mechanism.

It is another object of applicant's invention to provide in a screw or washer feeding means employing angularly intersecting guides or channels, means for bridging the gap formed in a side of one guide or channel at the intersection with the second guide or channel so that the screws or washers may readily and without tilting move across this gap.

Other objects and advantages of this invention will be apparent from the following detailed description when taken in connection with the accompanying drawings, wherein:

Figure 3 is a sectional view similar to Figure 2 showing certain parts in a different position of operation;

Figure 4 is an enlarged fragmentary plan view of a portion of the mechanism shown in Figure 1;

Figure 5 is a section taken along the line 5—5 of Figure 4; and

Figure 6 is an exploded view in perspective showing certain details of the transfer mechanism.

Figure 1:
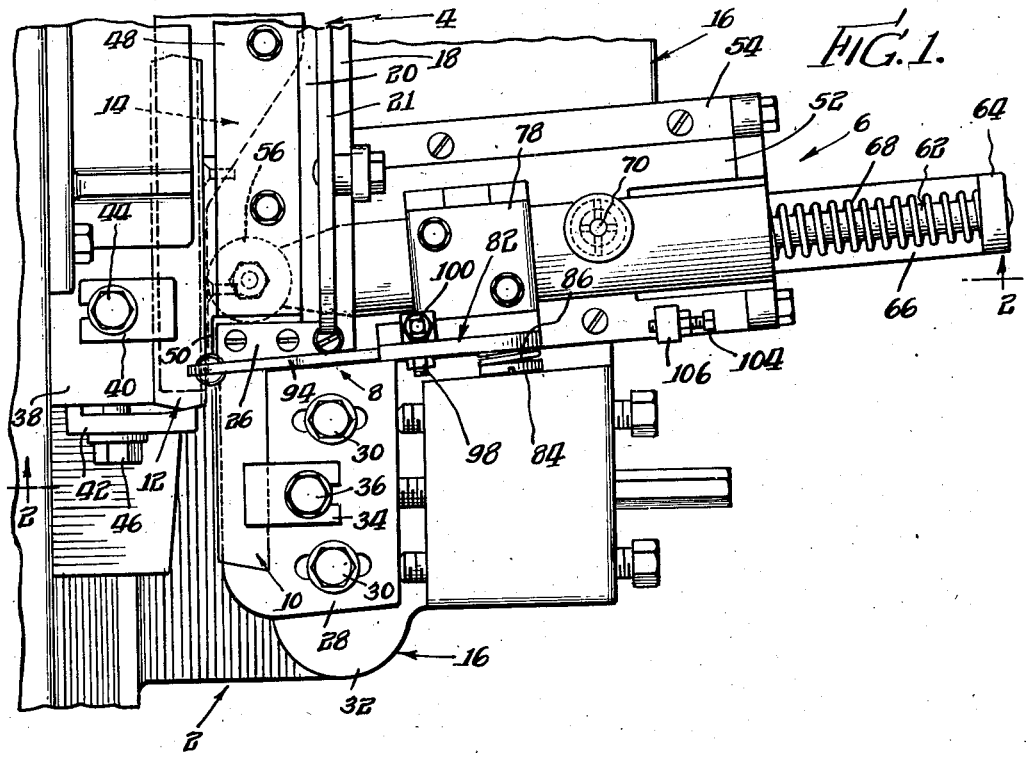
Figure 1 is a fragmentary plan view of a thread rolling machine and illustrating a transfer mechanism embodying the invention.

Standard thread rolling machines such as exemplified in Wilcox Patents No. 1,584,263, of May 11, 1926, and No. 1,798,919, of March 31, 1931, embody a transfer mechanism which engages the foremost screw blank at the bottom of an inclined guide chute and, conveying such screw blank along a guide chute transverse to the first inclined chute, transfers the screw blank into a pair of thread rolling dies. It sometimes occurs that the foremost screw blank, in moving from the first inclined guide chute into the second guide chute across the space between the rails of the second chute, is tilted, and upon engagement by the transfer mechanism becomes jammed in the chute where it remains until manually extracted from the second chute.

In screw and washer assembling machines such as shown in Hanneman Patent No. 2,152,591 there are provided transfer mechanisms similar to those shown in the previously mentioned Wilcox patents for the purpose of transferring screw blank and washer assemblies from an inclined feed chute to a second transfer chute and into thread rolling dies. In such screw and washer assembling machines it sometimes happens that a unit, in moving from the first chute onto the second chute across the space between the rails of the second chute, becomes tilted on the shank of the screw blank and instead of resting upon the surface of the second guide chute is, at one side, below the level of the surface and is forced by the transfer mechanism into binding engagement with a wall of the second chute so that the unit becomes jammed in this chute and thus prevents further operation of the machine until the jammed unit has been manually extracted.

Applicant's invention provides means which prevents such jamming of the screws or washers as the screw and washer assembly units are transferred from the first chute onto and along the second chute transverse to the first. It will be evident, of course, that applicant's invention is not restricted in its utility to machines of this character but may successfully be employed in any machine wherein, by reason of similar screw or screw and washer feed chutes, the same difficulties are encountered.

As shown in the drawings, the invention, for illustrative purposes, is embodied in a thread rolling machine 2 such as shown in the Wilcox and Hanneman patents, above noted, and having a guide chute 4, a transfer mechanism 6, a second guide chute 8, a stationary thread rolling die 10, a reciprocable thread rolling die 12, a starter mechanism 14, and an auxiliary base 16 inclined at an angle of thirty degrees to the horizontal and in turn supported upon a main base or pedestal, not shown.

The guide chute 4 is supported upon the base 16 at the same angle of inclination and comprises bars 18 and 20, which are spaced apart to provide between them a slot for the reception of the shanks of the screw blanks. The bars 18 and 20 are mounted on supporting brackets, not shown, secured to the base 16 in a manner to permit relative adjustment of the bars toward and from each other to accommodate screw blanks having shanks of different sizes, and a cover plate 21 (Fig. 5), which overlies the chute 4, is secured in any convenient manner to the bar 18 for vertical adjustment to accommodate screws having heads of different sizes. Screw blank and washer assembly units are fed to or deposited in the chute 4 by a suitable assembly mechanism, not shown, the shanks of the screw blanks being received between the bars 18 and 20 and the washers, positioned on the screw blanks beneath the heads thereof, resting upon the surfaces of these bars and bridging the space between them.

The guide chute 8 extends transversely of the guide chute 4 and is defined by a block 22 mounted on a bracket 24 fastened to or abutting the guide bar 20; a plate 26 fastened to and overlying the block 22; the lower edge of the guide bar 20; the upper edge of a die-supporting block 28 and the upper edge of the stationary die 10. The block 28 is adjustably mounted as by bolts 30 on an upstanding arm 32 of the base 16, and the stationary die 10 is detachably mounted on the block 28 as by clamping plate 34 and bolt 36.

The reciprocable die 12 is mounted in a recess in the inner face of a reciprocating member or gate 38 to which it is detachably secured as by clamping plates 40 and 42 and bolts 44 and 46.

The starter mechanism 14 comprises a slide bar 48, which carries at its forward end a forwardly projecting finger 50 alined centrally of the space between the dies 10 and 12 and terminating, when the slide bar is in its rearward position, a slight distance to the rear of the guide chute 8. The purpose of this starting mechanism is to assist the screw blanks to enter the dies, which, in the conventional manner, are beveled at their opposed ends to facilitate the initial reception of said blanks.

The transfer mechanism 6 comprises a slide plate 52 mounted in guideways formed in a fixed supporting plate 54 secured to the body 16 in any convenient manner. At its outer end the slide plate carries a cam roller 56 journalled thereon by a stud 58, and the cam roller cooperates with a cam 60 secured to the underside of the reciprocating member or gate 38 for movement therewith. The slide plate is guided upon a rod 62, and this rod is threaded at one end into an upstanding lug 64 of a casting 66 bolted to the outer end of the fixed supporting plate 54. A spring 68 surrounds the guide rod 62 and at its opposite ends bears against the lug 64 and the upstanding portion of the slide plate 52. The spring 68 moves the slide plate 52 inwardly and the cam 60 moves it outwardly against the action of the spring. A plunger 70 is provided to lock the slide plate against forward movement under action of the spring 68, and this plunger is rotatably mounted in a boss 72 projecting from the surface of the slide plate. The plunger 70 is depressible into an opening 74 in the fixed supporting plate 54 in order thus to lock the slide plate 52 against movement. A transfer or stop arm 76, which is adapted to engage the shank of a screw blank beneath the washer telescoped thereon, is mounted upon the slide plate 52 by a bracket 78. The bracket 78 is adjustably mounted on the plate 52 so that the transfer or stop arm 76 may be positioned centrally of the guide chute 8. The transfer or stop arm 76 is secured to the bracket 78 by a screw 80 passing through an enlarged aperture in the bracket so as to permit adjustment of the arm in a direction longitudinally of the chute 8.

A bell crank lever 82 is pivotally secured by a cap stud 84 to an upstanding arm of the bracket 78. A spring 86 is wound about the stud 84 and one end of the spring engages a pin 88 carried by the lower end of a vertical arm 90 of the bell crank, while the other end of the spring engages a pin 92 carried by the bracket 78.

A transfer or register finger 94, which is adapted to clamp upon the top of the screw head during the inward stroke of the slide plate, is adjustably mounted in a horizontal arm 96 of the bell crank 82, a mounting bolt 98 passing through an enlarged aperture in the arm 96. An adjustable set screw 100 is carried by the arm 96 and acts as a limit stop against the bracket 78, thereby to adjustably determine the lowered position of the transfer or register finger 94. An adjustable set screw 102 carried by an upstanding portion of the slide plate 52 is adapted to engage the guide bar 18 to limit the forward movement of the slide plate.

Figure 2:
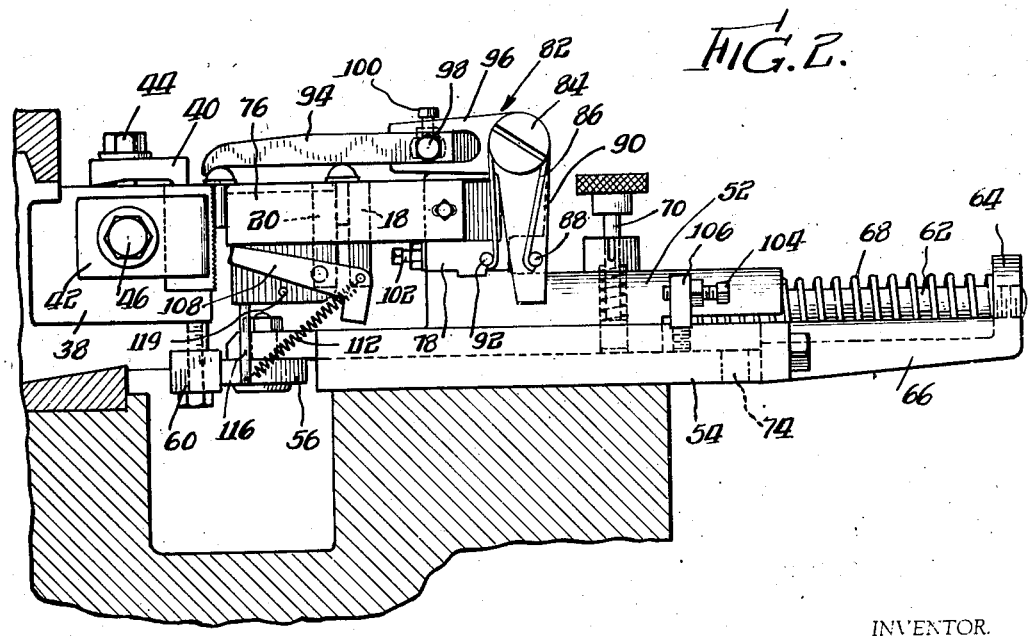
Figure 2 is a section taken along the line 2—2 of Figure 1.

An adjustable set screw 104 carried by a lug 106 upstanding from the fixed supporting plate 54 acts as an abutment engaging the arm 90 of the bell crank 82 as the slide plate is moved outwardly and thereby to rotate the bell crank and raise the transfer or register finger 94 so that a screw and washer assembly may move from the chute 4 into the chute 8 in advance of the transfer arm 76 and with the head of the screw blank beneath the upraised transfer finger, as shown in Figures 3 and 4. As the foremost screw and washer assembly passes from the chute 4 into the chute 8 there is a tendency for the screw to tilt in the chute 8 and for the washer to tilt on the shank of the screw, and when this occurs the next operation of the transfer arm causes the unit to bind in the chute 8. In order to prevent this, applicant provides a lever or finger 108 mounted within the chute 8 and pivoted on a pin or lug 110 secured to or formed upon the free face of the guide block 22. A spring 112, secured by a pin 114 to the lever 108 below the pivot pin 110 and to a pin 116 depending from the block 22, urges the lever into the position shown in Figures 3 and 4, wherein plane surface 118, which forms the upper free edge of the lever, lies in a common plane with the upper surface of the bar 20 of the guide chute 4 and extends substantially between the free edge of the plate 26 and the free edge of the block 28. Lug or pin 119, engaging a lateral arm of the lever, determines this position. In this position plane surface 120 of the lever extends in a vertical plane in alinement with the free inner wall surface of the bar 20 and provides with the forward edge of the transfer arm 76 a space in which is received the shank of the foremost screw blank as it moves from the chute 4 into the chute 8. The plane surface 118 supports the washer and the head of the screw blank during movement of the assembly unit into the chute 8 and therefore prevents tilting of the screw and tilting of the washer on the screw as the unit moves into said chute 8. As the transfer arm 76 moves inwardly along the guide chute 8, the lever 108 is moved by the shank of the screw blank in a counterclockwise direction, as seen in Figures 2 and 3, so as to uncover the chute 8 and permit movement of the assembly unit over the lever into the position shown in Figures 1 and 2, in which the shank of the screw blank is positioned in alinement with the space between the dies 10 and 12, and the washer and head of the screw bridge the space between the dies. The transfer or stop arm 76 and the transfer or register finger 94 cooperate to maintain the screw blank and washer in upright position and during the transfer movement prevent movement of the next assembly unit into the guide chute 8.

At the moment that the gate 38 begins to move forwardly to operate the die 12 the starter mechanism 14 is actuated to move the starter finger 50 forwardly into engagement with the shank of the screw blank and to push the assembly unit into tight engagement with the dies 10 and 12. The reciprocable die 12 moves forwardly a slight distance beyond the stationary die 10, and the assembly unit, being thus carried beyond the end of the die 10, drops into a suitable receiver, not shown, at the forward end of the body 16.

It will be evident from the foregoing description that applicant has provided an improved transfer mechanism for feeding headed fasteners from one guide channel or chute to and along a second guide channel or chute wherein tilting of the fasteners and resultant jamming of the fasteners on the second channel or chute is positively prevented; a mechanism for transferring screw blank and washer assembly units from a feeding chute to a thread rolling mechanism including means shiftable in the second channel, and constituting an extension of a rail of the first channel, from a first position so as to guide the units into the second channel, to a second position and out of alinement with the rail of said first channel so as to permit movement of the units along the second channel; and an improved transfer mechanism for feeding screw and washer assembly units from a feed chute to thread rolling dies including means for preventing tilting of the washers on the screws during the transfer, thereby preventing jamming of the washers in the transfer mechanism.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In combination, a first slotted guide for guiding and supporting headed fastener elements, a second slotted guide receiving the headed fastener elements from the first guide and guiding the elements along a path transverse to the first guide, and members shiftably mounted in the second guide for movement in a direction longitudinally of the second guide, said members being normally positioned on opposite sides of the slot in the first guide and of configurations to extend the top, supporting surface of the first guide and also the opposite side surfaces of the slot in said first guide across the slot of the second guide for guiding and supporting each element as it passes from the first to the second guide across the slot of the second guide to prevent canting of the element as it moves into the second guide.

2. In combination, a first slotted guide for guiding and supporting screw and washer assembly units, a second slotted guide for guiding and supporting the screw and washer assembly units, said second guide extending transversely of the first guide and receiving the assembly units from the first guide, and spaced members shiftably mounted in the second guide and extending the washer supporting surface of the first guide across the slot of the second guide to support the washer of each unit as the unit passes from the first to the second guide across the slot of the second guide thereby to prevent canting of the washer on the shank of the screw element as each unit moves into the second guide.

3. In combination, a first, inclined guide chute for feeding screw elements, a second guide chute for guiding screw elements from the first guide chute along a path transverse to the first guide chute, a transfer mechanism controlling the feeding of the screw elements from the first chute into and along the second chute, said transfer mechanism including a pusher member movable from one side of the first chute through the slot in the second chute to move the screw elements along the second guide chute, and a member shiftably mounted in the second guide chute and extending the opposite side of the first guide chute across the slot of the second guide chute to support each screw element as it passes from the first to the second guide chute thereby to prevent canting of the screw elements as they move into the second chute in the path of the pusher member.

4. In combination, a first, inclined slotted guide for feeding screw elements, a second slotted guide communicating with the first guide and extending transversely to the first guide, a transfer mechanism controlling the feeding of the screw elements from the first guide to the second guide and moving the screw elements along the second guide, said transfer mechanism including a transfer member movable along the second guide across the slot in the first guide, and a shiftable member in the second guide forming an extension of the first guide when the transfer member is in a position uncovering the slot of the first guide, said shiftable member cooperating with the transfer member to support and guide the screw elements from the first guide into the second guide to prevent canting of the screw element in the second guide, said shiftable member being shifted by the engaged screw element as it is fed along the second guide by the transfer member to uncover the slot in the second guide.

5. In combination, a first slotted guide for guiding the screws of screw and washer assembly units and having a surface for supporting the washers as they move along the guide, a second slotted guide for guiding the screw of the screw and washer assembly units along a path transverse to the first guide and having a surface for supporting the washers as the units move along the second guide, a transfer element shiftable along the second guide across the slot in the first guide from a position on one side of and uncovering the slot in the first guide thereby to feed the units one by one along the second guide while holding the remaining units in the first guide, a member extending into the slot of the second guide and constituting an extension of the washer supporting surface of the opposite side of the first guide thereby to engage and prevent canting of the washer on its associated screw element as the unit passes from the first guide into the second guide, and means for shiftably mounting said member for movement to a position uncovering the slot of the second guide to permit feeding of the unit along the second guide by the transfer element.

6. In combination, a first slotted guide for guiding headed fastener elements and having a surface for supporting the heads of the fastener elements, a second slotted guide receiving the headed fastener elements from the first guide and guiding the elements along a path transverse to the first guide and having a surface for supporting the heads of the fastener elements, a pusher member movable along the second guide from one side of the first guide and having a surface in the plane of the surface of the second guide to support the heads of the fastener elements, and a shiftable member in the second guide forming an extension of the opposite side of the first guide to support and guide each element across the gap formed at the intersection of the guides, said shiftable member being shifted by each engaged element as the element moves along the second guide to uncover the slot in the second guide.

7. In combination, a first inclined guide chute for conveying headed fastener elements, a second inclined guide chute intersecting and extending at an angle to the first chute for receiving and further conveying said headed fastener elements, said chutes having smooth top surfaces lying in a common plane, shiftable members extending as a continuation of the first chute to provide an uninterrupted top surface for conveying fastener elements uninterruptedly into the second chute, one of said shiftable members closing the second chute, said closing member being movable out of the path of the headed fastener elements as they move along said second chute, whereby said elements may be transmitted along the second chute without interference by the closing member, the other of said shiftable members comprising a feed finger for transmitting the fastener elements along the second chute.

8. In combination, a first inclined guide chute for conveying units of headed fastener elements with telescoped washers, a second inclined guide chute intersecting and extending at an angle to the first chute for receiving and further conveying said units, said chutes having smooth top surfaces lying in a common plane for supporting the washers, shiftable members extending as a continuation of the first chute to provide an uninterrupted top surface for maintaining the washers against canting on the fastener elements as the units move into the second chute, one of said members comprising a yieldable gate closing the second chute, but movable out of the path of the headed fastener elements as the units move along said second chute, whereby said elements may be transmitted along the second chute without interference by said gate, the other of said shiftable members comprising a feed finger for transmitting the units along the second chute.

9. In combination, a first inclined slotted guide for conveying units of screw elements with telescoped washers, a second inclined slotted guide intersecting and extending substantially at right angles to the first chute for receiving and further conveying said units, said guides having smooth upper surfaces lying in a common plane for supporting the washers, shiftable members in the slot of the second guide, one of said members comprising a gate pivotally mounted in the slot of the second guide and having a side surface forming a continuation of one wall of the slot in the first guide and an upper surface portion forming an extension of the upper surface portion of the first guide on one side of the slot in the first guide, resilient means normally urging said gate into position closing the slot of the second guide for permitting movement of the gate out of the path of the screw elements as the units move along said second guide, whereby said units may be transmitted along the second guide without interference by said gate, the other of said shiftable members comprising a feed finger slidably mounted for movement through the slot of the second guide to transmit the units along the second guide.

CARL G. OLSON.